United States Patent [19]

Glass, Jr. et al.

[11] 4,084,060

[45] Apr. 11, 1978

[54] PROCESS FOR THE SYNTHESIS OF HYDROXYETHYL CELLULOSE WITH IMPROVED RESISTANCE TO ENZYME CATALYZED HYDROLYSIS

[75] Inventors: Joseph Edward Glass, Jr., Charleston; Roy Gale Lowther, St. Albans, both of W. Va.

[73] Assignee: Union Carbide Corporation, New York, N.Y.

[21] Appl. No.: 742,885

[22] Filed: Nov. 18, 1976

[51] Int. Cl.$^2$ .............................................. C08B 11/08
[52] U.S. Cl. ........................................ 536/96; 536/85; 536/88
[58] Field of Search .................. 536/96, 84, 85, 88

[56] References Cited

U.S. PATENT DOCUMENTS

| 2,388,764 | 11/1945 | Reichel et al. ........................ 536/90 |
| 2,667,481 | 1/1954 | Tasker .................................. 536/90 |
| 2,687,411 | 8/1954 | Higgins ................................ 536/87 |
| 2,744,894 | 5/1956 | Benedict et al. ...................... 536/96 |
| 3,131,176 | 4/1964 | Klug ..................................... 536/96 |
| 3,131,177 | 4/1964 | Klug et al. ............................ 536/96 |
| 3,278,520 | 10/1966 | Klug ..................................... 536/95 |
| 3,388,082 | 6/1968 | Rodgers et al. ................... 260/17 R |
| 3,652,539 | 3/1972 | Miura et al. .......................... 536/85 |
| 3,709,876 | 1/1973 | Glomski et al. ................... 260/17 R |
| 3,769,247 | 10/1973 | Glomski et al. ................... 260/17 R |
| 3,873,518 | 3/1975 | Strange et al. ....................... 536/91 |

*Primary Examiner*—Ronald W. Griffin
*Attorney, Agent, or Firm*—Bernard Francis Crowe

[57] ABSTRACT

A process for the synthesis of hydroxyethyl cellulose having improved resistance of enzyme catalyzed hydrolysis is provided by employment of a controlled, optimum amount of available water for swelling the cellulose in aqueous caustic reaction medium in hydroxy ethoxylation sequences of first high and then low ratios of caustic:cellulose.

11 Claims, 10 Drawing Figures

FIG. 5 ENZYME RESISTANCE TEST RESULTS: PROCESS AND PRODUCT COMPARISONS IN AQUEOUS SOLUTIONS

PROCESS FOR THE SYNTHESIS OF HYDROXYETHYL CELLULOSE WITH IMPROVED RESISTANCE TO ENZYME CATALYZED HYDROLYSIS

BACKGROUND OF THE INVENTION

This invention pertains to the preparation of hydroxyethyl cellulose having enhanced resistance to enzyme catalyzed hydrolysis, and more particularly to the use of an optimum amount of water in the synthesis of a high molar substitution (M.S), greater resistance hydroxyethyl cellulose with low aqueous solution insolubles. This is accomplished by controlling the amount of water available to the cellulose/caustic reaction medium during the ethoxylation reactions wherein the etherification is interrupted at some intermediate M.S. stage and the alkali concentration is lowered before ethoxylation is permitted to proceed to completion.

Water-soluble cellulose ethers are used widely as thickening agents in a variety of water-borne latex paints. However, cellulose ethers are subject to enzymatic hydrolysis when mercurial compounds are removed from the formulations for environmental reasons. The resulting viscosity loss is detrimental to overall coating performance, i.e. an inadequate viscosity at high shear rates results in poor hiding of the coated substrate, an inadequate viscosity at low shear rates results in sagging of the applied paint from a vertical substrate, and loss of viscosity in the stored can leads to pigment sedimentation, i.e. a spoiled paint to the layman.

It is generally theorized that enzymatic instability is a function of the percentage of unsubstituted anhydroglucose units (% uAGU), and in particular to unsubstituted run sequences of three or more of these units in the backbone of a cellulose ether. In turn, the number of unsubstituted anhydroglucose units, at a given degree of substitution is expected to be, in part, related to the extent of chaining, i.e., competitive reactivity between the hydroxyls of added hydroxyethyl groups and the unreacted hydroxyl functions of the cellulose backbone. In agreement with these observations, enzyme resistant hydroxyethyl cellulose has been difficult to produce. This problem has prompted several attempts to prepare enzyme resistant cellulose ethers by utilizing, at least in part, an etherification reagent which reduces or eliminates the competitive chaining reaction. For example, U.S. Pat. No. 3,388,082 discloses the preparation of hydroxypropyl methyl cellulose (HPMC) having increased enzymatic resistance. Unfortunately, this cellulose derivative shows only a moderate increase in stability towards enzymatic hydrolysis and the latex paint industry has found that good color development and compatibility are not possible between hydroxypropyl methyl cellulose and most colorants.

U.S. Pat. Nos. 3,709,876 and 3,769,247 describe a two-step synthesis of cellulose ethers consisting of the methylation of cellulose with methyl chloride, followed by ethoxylation to produce hydroxyethyl methyl cellulose (HEMC). These products are useful as paint thickeners but the formation of inorganic halides in the methylation step and the undesirable hydration characteristics produced by the use of high glyoxal treatment of the final HEMC product, to achieve removal of organic and inorganic byproducts from the high gel-point polymer, are undesirable aspects with respect to the economics of production and to the use of such products in coating formulations.

This undesirability is reflected in U.S. Pat. No. 3,873,518 wherein a description of a process for the production of hydroxyethyl hydroxypropyl methyl cellulose (HEHPMC) is described for the synthesis of an enzymatic resistant derivative, which provides easier manufacturing and purification procedures. Examination of resistance to enzymatic hydrolysis indicates HEHPMC to be inherently less bioresistant than HEMC; it is merely an attempt to resolve the colorant incompatibilities associated with HPMC described in U.S. Pat. No. 3,388,082 and possess only a moderate improvement in enzymatic stability.

In addition, it also is known in the art of synthesizing cellulose ethers that the use of two-stage processes are significant in the production of improved products. Of particular significance to the disclosures of this invention is the use of two-stage processes wherein the etherification reaction is interrupted at some intermediate stage and the product extracted or alkali or other ingredient proportions modified before continuing additional etherification of the product. Such techniques are disclosed in U.S. Pat. No. 2,388,764, 2,667,481, 2,687,411, 3,131,176, 3,131,177 and 3,652,539. They are described as useful in the production of cellulose ethers through general improvement in such properties as solution clarity, minimization of insoluble gels and as improved procedures for extraction of cellulose ethers during the intermediate stages of production.

SUMMARY OF THE INVENTION

It has now been discovered that hydroxyethyl cellulose (HEC) having improved resistance to enzyme catalyzed hydrolysis can be synthesized if the amount of water available to the cellulose/alkali reaction medium is controlled to a level of about 6.5 to about 10.5 weight % of the total charge weight in a process wherein the hydroxyethylation is interrupted at some intermediate stage of molar substitution (M.S.) and the alkali concentration is lowered before etherification is permitted to proceed to a final M.S. in the range of 3.6 to 6.0. The term alkali is used herein to mean alkali metal hydroxides, such as, sodium hydroxide, potassium hydroxide, lithium hydroxide, and the like. By utilizing controlled water availability in the variable alkali concentration catalyzed synthesis procedure, an HEC with substantially improved enzymatic resistance in both aqueous solutions and coating formulations is obtained which has low aqueous solution insolubles and which also possesses improved production economics and product performance, such as, good colorant compatability, and the like, not obtainable with other cellulose ethers, as for example, HEMC, HEHPMC, HPMC, and the like. The preparation procedure involves an ethoxylation reaction which is interrupted at an intermediate stage of molar substitution, approximately 0.6 to 1.3. The relatively high caustic-cellulose ratio (0.30–0.38) employed to swell the cellulose in obtaining the intermediate M.S. HEC is reduced to the range of 0.06 to 0.12 whereupon the ethoxylation reaction is continued to a final M.S. of 3.6 to 6.0.

Employment of ethoxylation reaction in accordance with the prior art, which is interrupted at some intermediate stage, does not produce hydroxyethyl cellulose with a significant degree of resistance to enzymatic hydrolysis. Furthermore, an increase in the molar substitution ratio improves resistance to enzymatic hydrolysis only slightly, i.e. to the level disclosed in U.S. Pat. No. 3,388,082 which describes the preparation of an enzymatically stable hydroxypropyl methyl cellulose. The present invention provides a method for substantially improving resistance to enzymatic hydrolysis by observing that the percent water incorporated into the slurry mixture has a dramatic effect upon the enzymatic stability, generally via a parabolic relationship, in an etherification reaction in which synthesis of hydroxyethyl cellulose is interrupted at the intermediate M.S. stage, with additional etherification occurring at a lower caustic concentration. The preferred water level depends on the dispersant or dispersants employed and the degree of solution clarity desired while obtaining HEC having optimum resistance to enzymatic hydrolysis.

It has been discovered that either a partial neutralization, i.e., one in which an inorganic or organic acid, such as, acetic acid, propionic acid, nitric acid, hydrochloric acid and phosphoric acid and the like and combinations thereof, is added following a time sequence wherein the intermediate M.S. range is estimated to occur by predetermined kinetic rates, or a two stage, extraction synthesis procedure may be employed within the controlled available water embodiment of this invention to produce hydroxyethyl cellulose with both an improved resistance to enzymatic hydrolysis and low insolubles. The two stage, extraction process is preferred as it permits economical extraction of the intermediate product, which minimizes inorganic by-product removal from the final, high M.S. HEC, and permits substantially improved ethylene oxide addition efficiencies in the second stage etherification reaction via removal of reactive organic by-products produced in substantial quantities in the higher alkali/cellulose catalyzed first stage reaction.

Removal of the inorganic by-products, which have no effect on the low caustic/cellulose catalyzed ethylene oxide addition efficiency creates a slurry instability problem upon neutralization in the synthesis procedure. The addition of certain inorganic salts to the extracted HEC eliminates this slurry instability problem and is acceptable, with the contained salt, in some final application areas. In application areas where residual salts in the final product are undesirable, slurry stability is maintained by the addition of less hydrophilic dispersants, prior to neutralization. In employment of the 2-stage, extraction, controlled water synthesis, it is important in contrast to the teachings of U.S. Pat. No. 2,667,481 that the intermediate product not be dried, for the final, high M.S. HEC obtained from the dried intermediate imparts a high degree of insolubles to aqueous solutions and produces undesirable flaws in applied coatings.

DESCRIPTION OF THE INVENTION

The characteristic features of the present invention lie in the discovery that the percent water available to the dispersed caustic/cellulose medium is the key to the production of an hydroxyethyl cellulose with substantial resistance to enzymatic hydrolysis and low solution insolubles. The optimum amount of water is dependent upon the organic dispersant or dispersants employed. In general although the concentration of water can range from about 6.5 to about 10.5 weight % based on the weight of the total dispersant, it is preferred to use about 7.5 to about 8.0 weight %.

The relative reactivities of the hydroxyls at the two, three and six position of cellulose have been determined in etherification reactions with ethylene oxide by identification of the products of acid hydrolysis via tedius chromatographic analyses. Numerous ratios have been suggested and argued in the open literature. The most recent of these undertakings, by Ramnas and Samuelson, Svensk Papperstidn, 71, pages 674 and 829 (1968) and 76 page 569 (1973), have determined the relative reactivities in homogeneous solution preparations to depend upon the hydroxide ion concentration employed in catalyzed reactions. Their results are reported in Table I, wherein the reactivity at the $C_x$ position represents the reactivity of hydroxyl groups generated by the addition of ethylene oxide to any of the three available anhydroglucose hydroxyl functions.

TABLE I
REACTIVITY RATIO/CAUSTIC CONCENTRATION RELATIONSHIPS REPORTED BY RAMNAS AND SAMUELSON

| CAUSTIC CONCENTRATION | | REACTIVITY RATIO PER HYDROXYL POSITION |
|---|---|---|
| WT. % NaOH IN AQUEOUS PHASE | ALKALI/CELLU-LOSE RATIO | $C_2:C_3:C_6:C_x$ (AVERAGE) |
| 3 | .05 | 2.8:1.0:2.8:1.5 |
| 10 | .17 | 3.5:1.0:4.8:4.0 |
| 18 | .31 | 4.4:1.0:8.0:12.0 |
| 22 | .38 | 5.0:1.0:11.0:15.0 |

Figure 1:
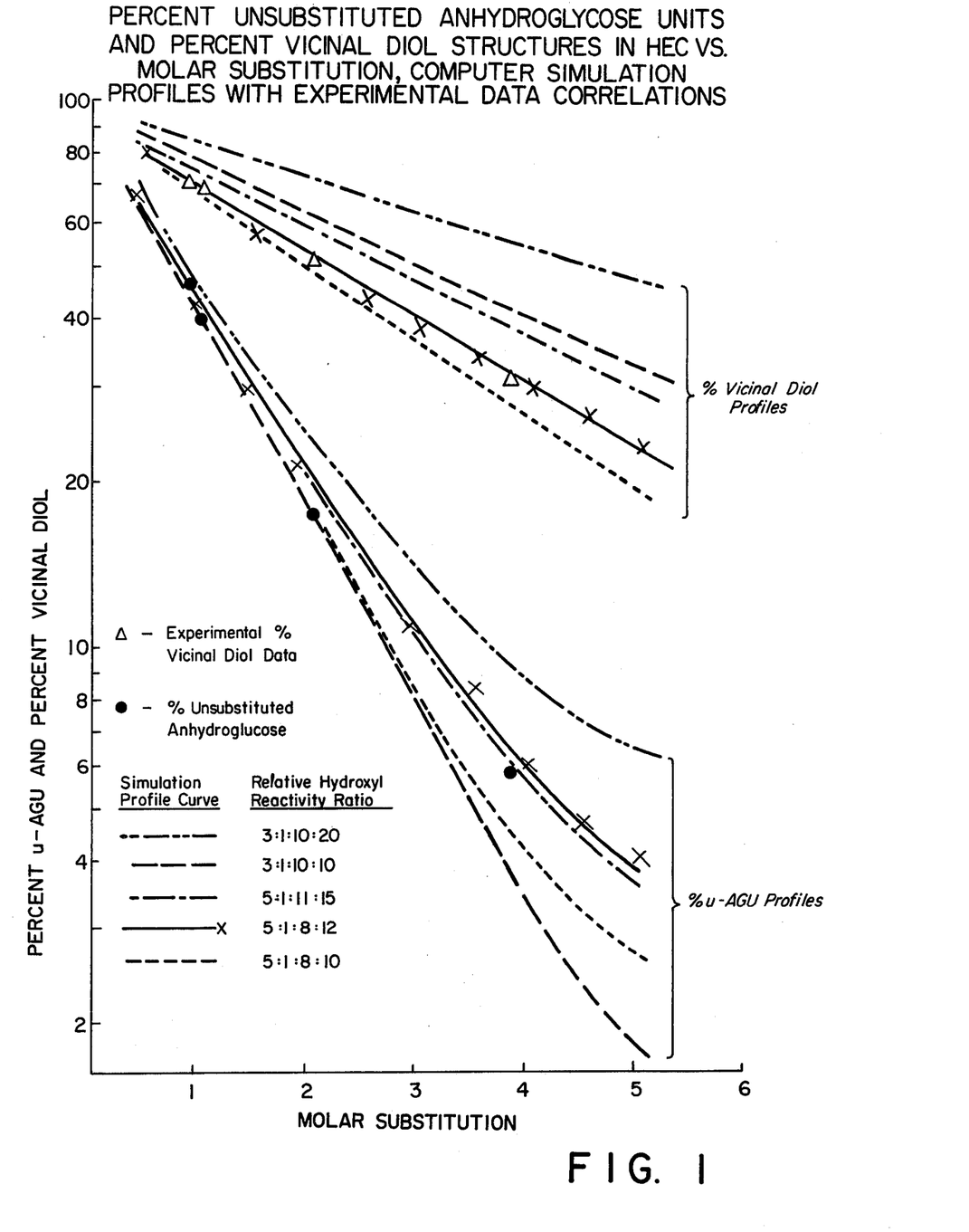
FIG. 1 is a plot of the percent unsubstituted anhydroglucose units and percent unsubstituted vicinal diol structures (the adjacent two/three hydroxyl positions) as a function of hydroxyethyl molar substitution (M.S.). Simulation profiles, calculated via computer stochastic modeling processes, are projected and compared with experimental data to obtain an estimate of the reactivities of ethylene oxide with anhydroglucose hydroxyl groups at the two, three and six positions and the hydroxyl groups of hydroxyethyl functionalities generated from the reaction of ethylene oxide with the two, three and six positions.
Figure 2:
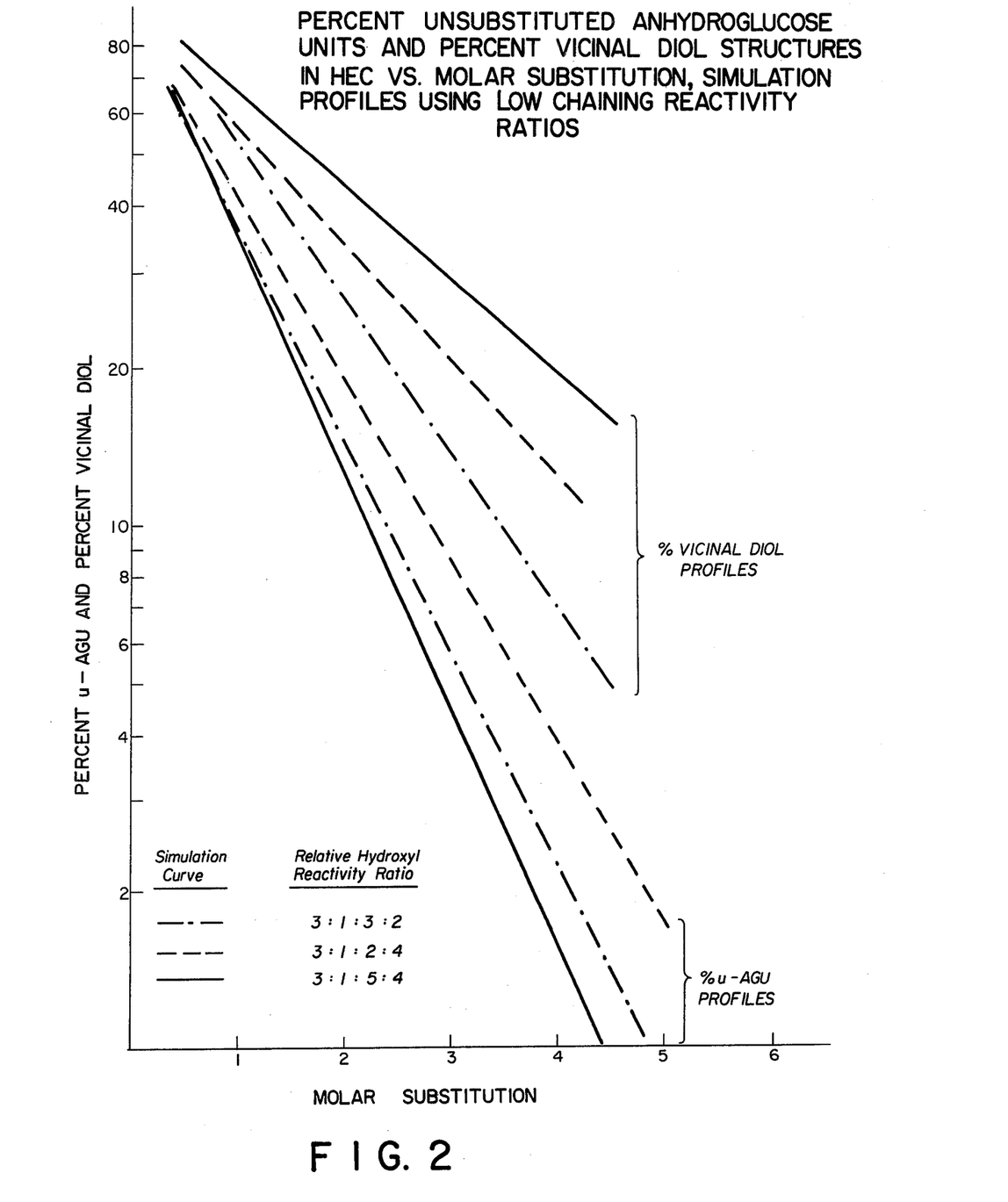
FIG. 2 is a plot of simulations of the percent unsubstituted anhydroglucose units and the percent unsubstituted vicinal diol structures (the adjacent two/three hydroxyl positions) as a function of hydroxyethyl molar substitution (M.S.) for relatively uniform reactivity ratio projections.

In an effort to evaluate the validity of changes in reactivities of the various hydroxyls as a function of caustic concentration in a heterogeneous slurry process with the reported homogeneouus etherifications, a less tedius analytical approach was devised wherein stochastic modeling via computer calculations were projected for the percent unsubstituted anhydroglucose units and percent vicinal hydroxyls, i.e. the adjacent unsubstituted hydroxyls at the two and three carbon positions of any anhydroglucose unit, as a function of the molar substitution of those units of cellulose with ethylene oxide. The experimental results project best with a model simulation employing reactivity ratios of 5:1:8:12, thus showing an agreement between the instant heterogeneous slurry reactivity ratios and those reported by Ramnas and Samuelson in homogeneous etherification reactions. These results are depicted in FIG. 1. To project the utilization of changes in reactivities for better distribution (less chaining) of the hydroxyethyl functionalities, stochastic models for lower alkali to cellulose ratios were projected in FIG. 2 and superimposed in FIG. 3 to fit a practical, modified etherification reactions in which the process is interrupted at an intermediate M.S. value and the caustic to cellulose ratio is reduced before additional etherification. In a heterogeneous slurry process ethoxylation at a low caustic/cellulose ratio, throughout the total synthesis, results in a high aqueous insolubles product.

Figure 3:
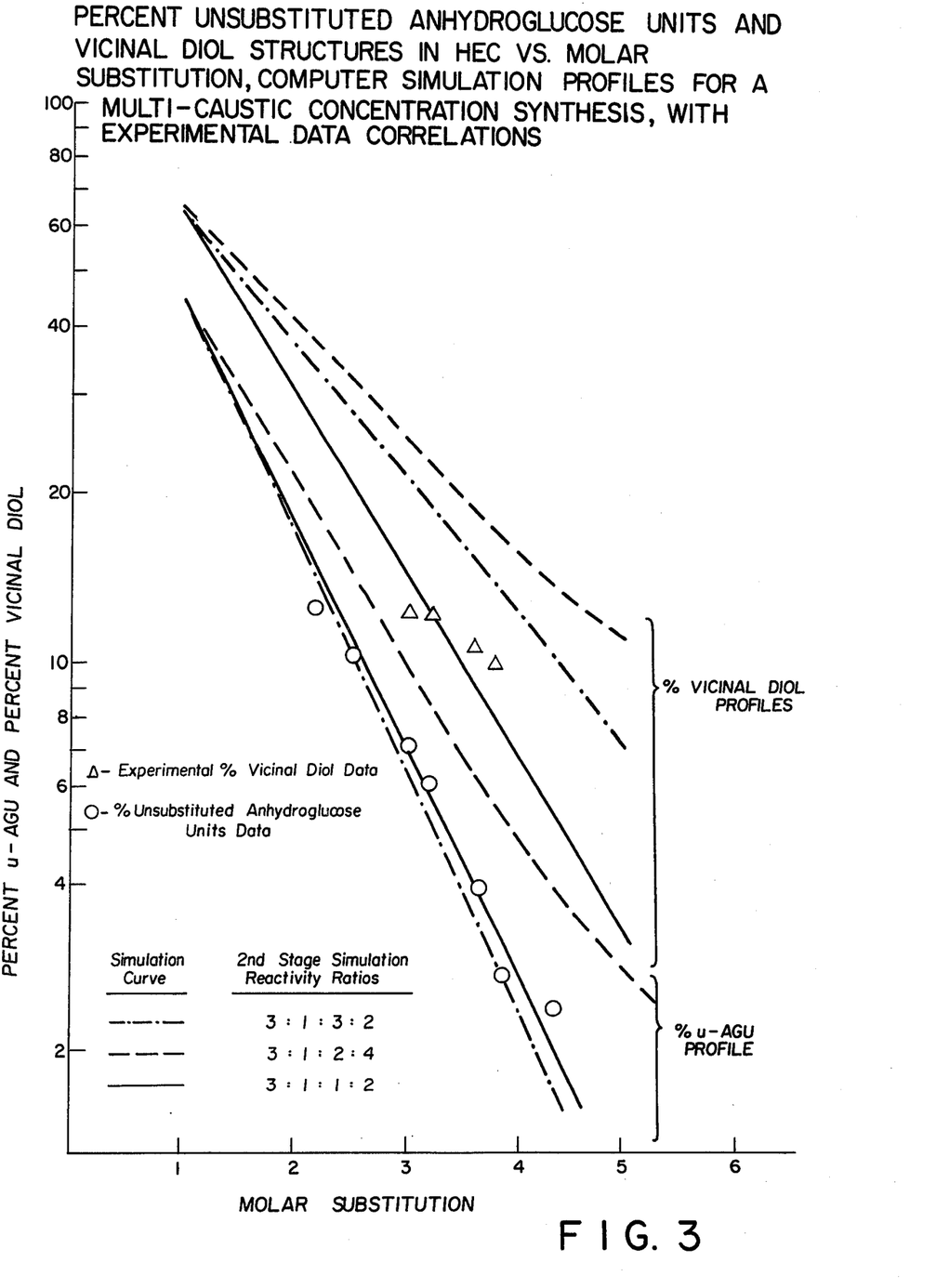
FIG. 3 is a plot of the imposition, per a variable caustic concentration synthesis, of simulation reactivity ratios: 5:1:8:12 (experimentally verified in FIG. 1 to correspond with the reactivity of ethylene oxide under a caustic/cellulose ratio of 0.35) with more uniform, i.e. less chaining, reactivity simulation profiles anticipated for lower caustic/cellulose, wherein the caustic/cellulose is lowered at an intermediate M.S. of 0.8. Experimental data point overlays define reactivities under low caustic/cellulose synthesis conditions.

As illustrated in FIG. 3, for a synthesis process in which the intermediate product is extracted, the reactivities at a low alkali to cellulose ratio (0.075) are: 3:1:1:2, which indicate a substantial reduction in the chaining of hydroxyethyl functionalities. In similar studies wherein the product is not extracted, but the caustic/cellulose ratio is reduced as an intermediate step the reactivitives are best approximated by a 3:1:3:2 ratio; thus, demonstrating that the reactivities in a heterogeneous synthetic process are equivalent to those academically observed in homogeneous syntheses of HEC.

Figure 4:
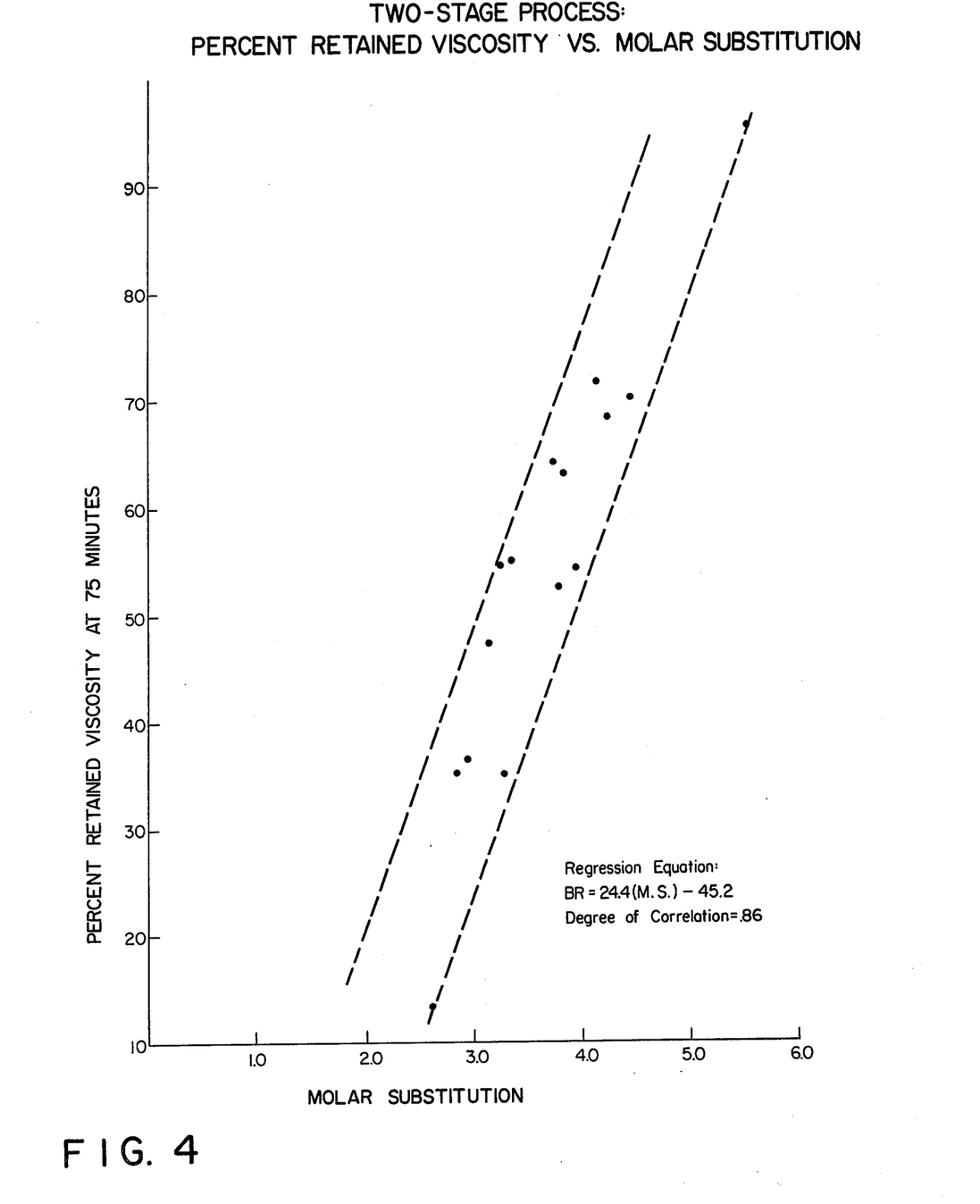
FIG. 4 is a plot of the relationship between molar substitution and the percent retained viscosity (at 75 minutes, 30° C., after inoculation with 10 ppm Aspergillus Niger) of 1% aqueous two-stage/extraction, controlled water process HEC.

In a multiple caustic concentration synthesis the percent retained viscosity is proportional to the total molar substitution (M.S.) of ethylene oxide. This relationship, illustrated in FIG. 4, was determined by linear regression analysis of experimental data to be: Bioresistance (BR) = 24.4 (M.S.) − 45.2. The degree of correlation for this equation is 0.86. Likewise, it also was determined that the bioresistance is proportional in a process wherein the caustic is varied at an intermediate M.S. stage, between 0.6 and 1.3, to the degree of unsubstituted anhydroglucose units in the cellulose molecule. A relationship is not evident in a synthesis process wherein the caustic/cellulose ratio is not varied, and it is at best, only vaguely apparent at certain process water levels even in a multi-stage process.

Figure 5:
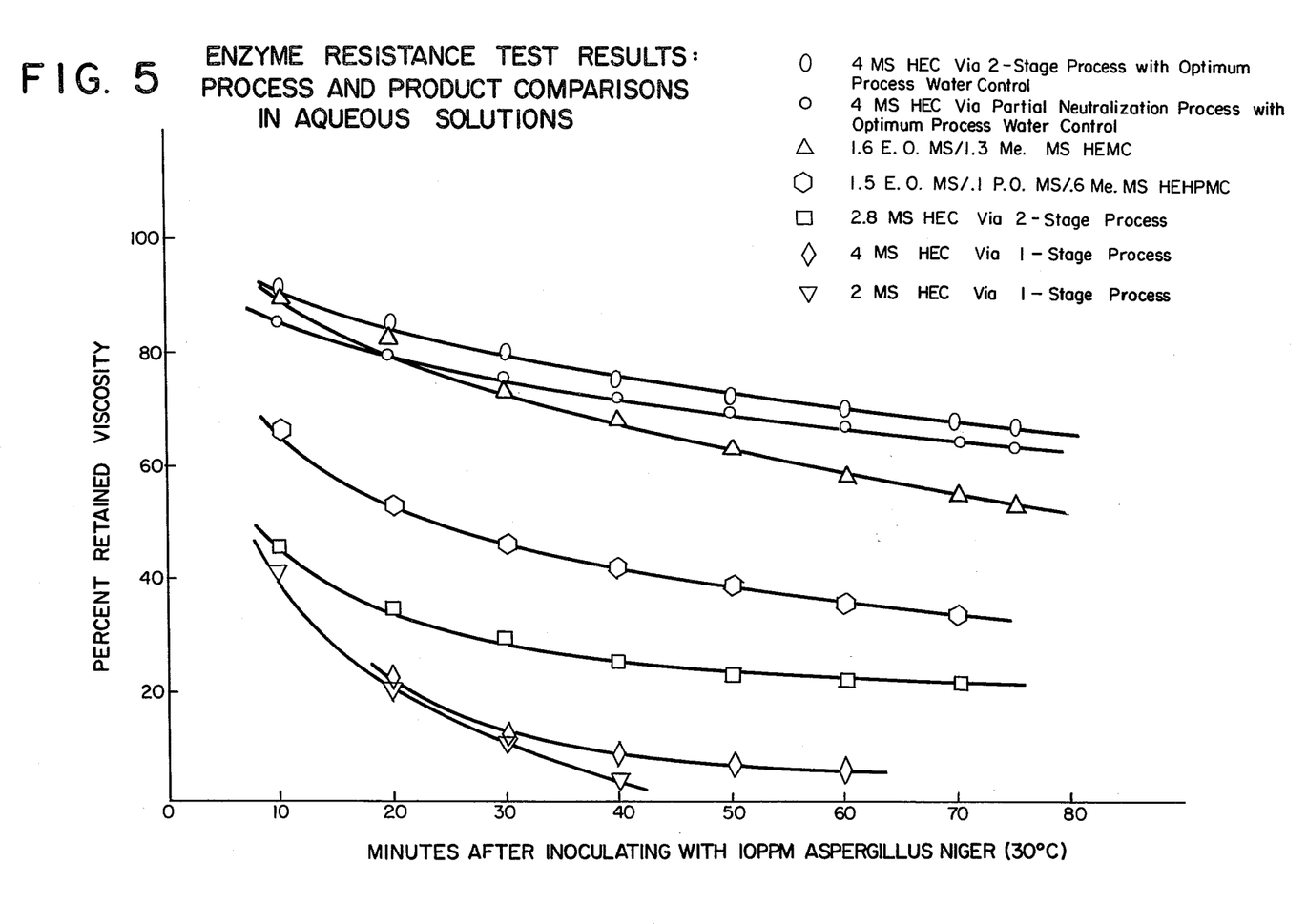
FIG. 5 is a plot of the time dependence of 1% aqueous solution viscosities for different cellulose ethers (30° C., pH = 5.7) after inoculation with 10 ppm Aspergillus Niger.
Figure 6:
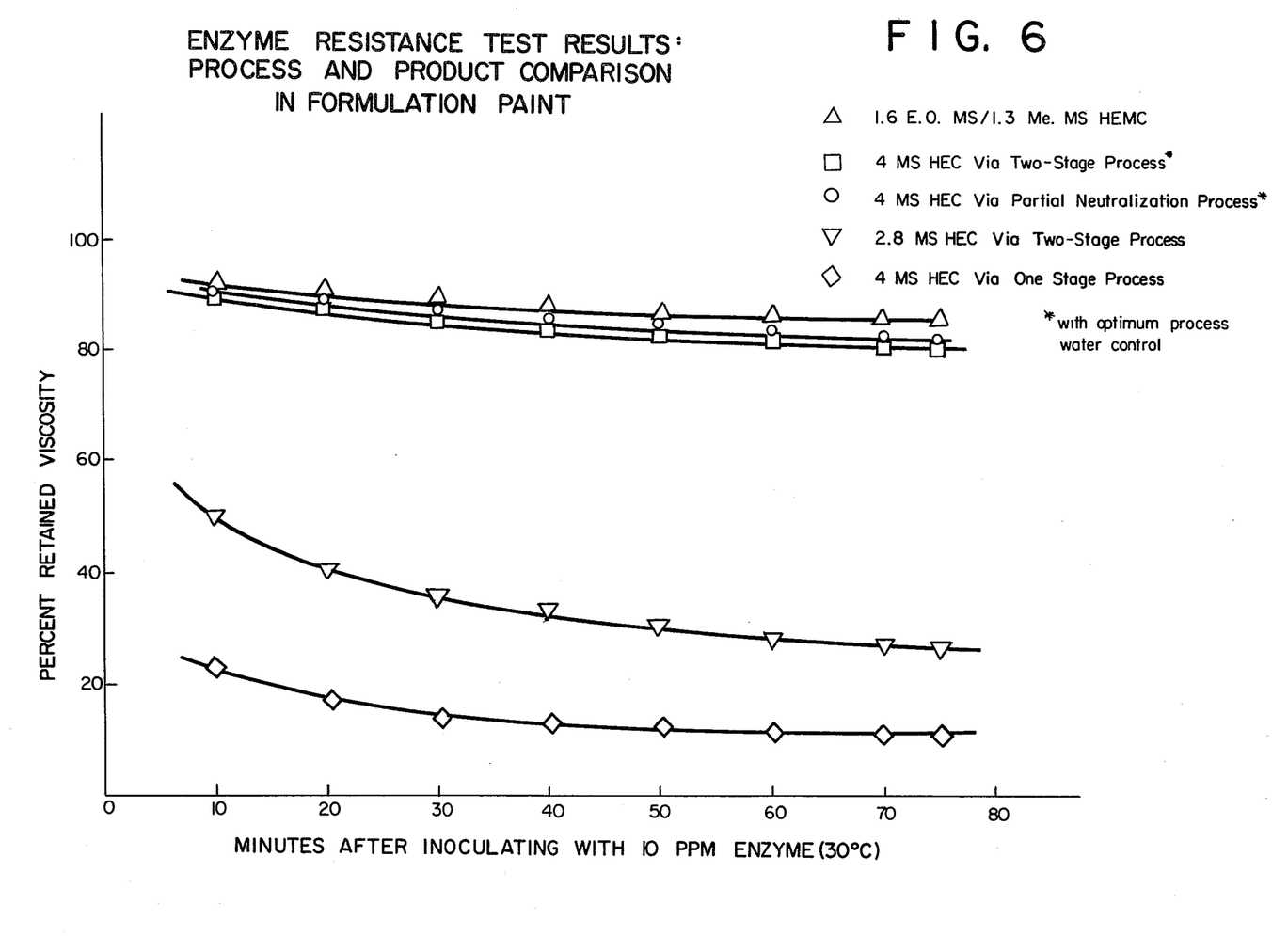
FIG. 6 is a plot of the time dependence of the percent retained viscosity of paint formulations, thickened with different cellulose ethers (30° C., inoculated with 10 ppm Aspergillus Niger).

The resistance to enzymatic hydrolysis of various water-soluble cellulose ethers in both aqueous solutions and in an interior trade sale paint formulation, given in Table II are illustrated in FIGS. 5 and 6, respectively. The cellulose ethers are representative of those described in U.S. Pat. No. 3,709,876, 3,769,247 and 3,873,518. They are compared with a standard HEC in the 2.0 to 2.5 M.S. range, and a high M.S. (4.0) HEC made at a high alkali to cellulose ratio (0.30 to 0.38). All of the materials are to be compared with a high M.S. (4.0) HEC prepared wherein the etherification reaction is interrupted at an intermediate M.S. range (0.6 to 1.3) and the alkali to cellulose ratio is lowered to the vicinity of 0.06 to 0.12 before the etherification reaction is continued with ethylene oxide in the presence of a preferred amount of available water to obtain a high M.S. HEC.

TABLE II
INTERIOR PAINT FORMULATION

| COMPONENT | WT. % (LBS.) |
|---|---|
| Water | 430 |
| CELLOSIZE QP-15,000[a,b] | 5 |
| Tamol 731[c] | 4 |
| KTPP[d] | 1 |
| TERGITOL NPX[e] | 1 |
| Ethylene Glycol | 20 |
| Butoxyethoxy Propanol | 15 |
| Colloids 581-B[f] | 3 |
| Dowicil 100[g] | 1 |
| TiO$_2$ | 150 |
| ASA-W[h] | 250 |
| Gold Bond R[i] | 60 |
| UCAR 360 (55% T)[j] | 220 |
| Total | 1160 |

[a]In comparative enzyme inoculation studies different cellulose ethers were substituted for this thickener.
[b]Cellosize is a tradename of Union Carbide Corp. for hydroxyethyl cellulose. Cellosize QP-15,000 has a Brookfield viscosity at 25° C. of about 1000 cps as 1 wt % aqueous solution.
[c]Tamol 731 - Copolymeric pigment dispersant sold by Rohm and Haas.
[d]KTPP - Potassium tripolyphosphate.
[e]Tergitol NPX - Ethoxylated nonyl phenol surfactant available from Union Carbide Corp.
[f]Colloids 581-B - defoamer sold by Colloids Inc.
[g]Dowicil 100 - non-mecuric preservative for can coatings sold by Dow Chemical Co.
[h]ASA-W - Kaolin clay filler sold by Freeport Co.
[i]Gold Bond R - crystalline silica filler sold by Lowe Co.
[j]Ucar 360 - vinyl acrylic latex available from Union Carbide Corp.

Figure 8:
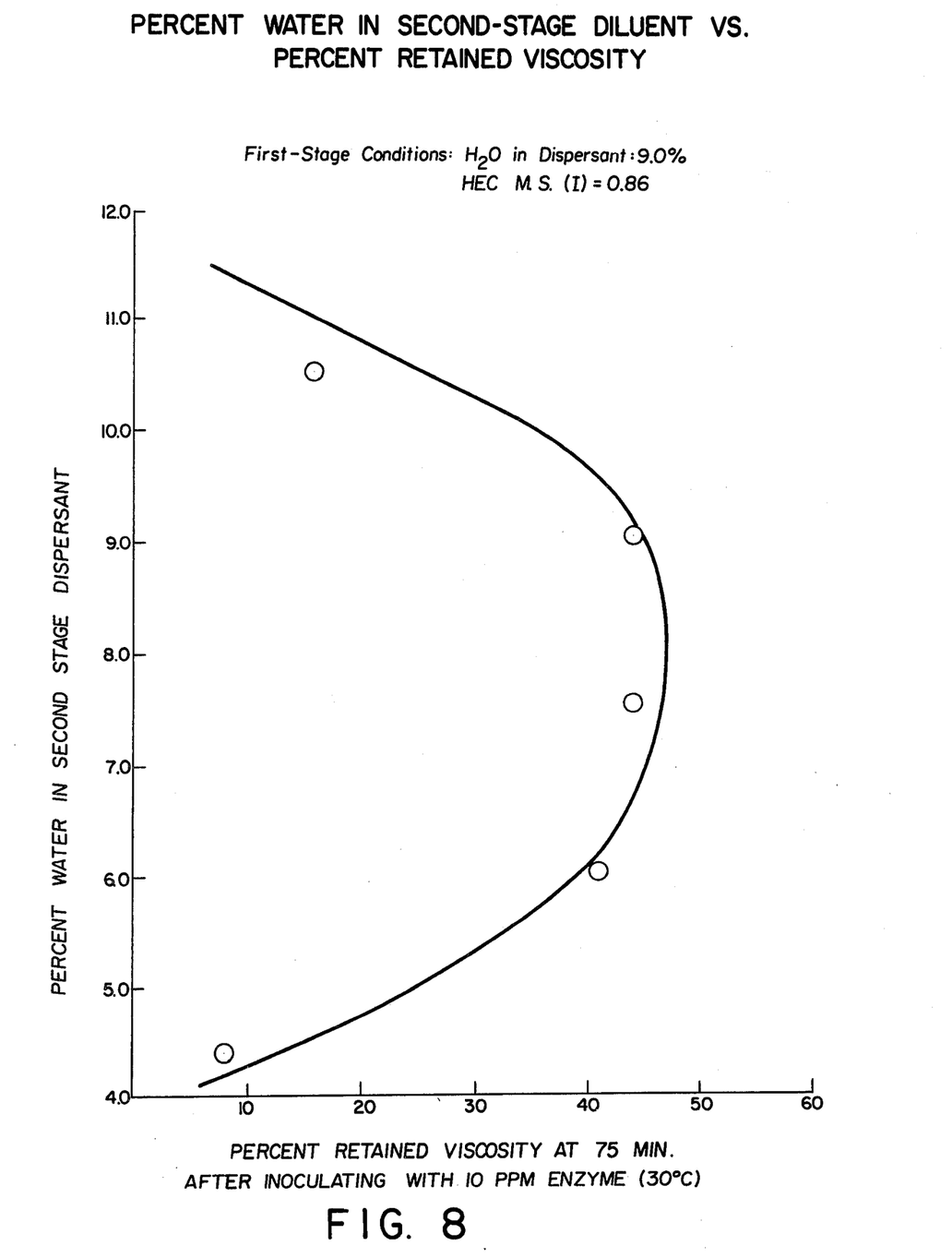
FIG. 8 is a plot of the parabolic relationship between the percent water employed in the second-stage, low caustic/cellulose catalyzed synthesis of hydroxyethyl cellulose in which 9 weight percent water was employed during first-stage, higher caustic/cellulose catalyzed synthesis and the process was interrupted at an intermediate M.S. of 0.86.
Figure 9:
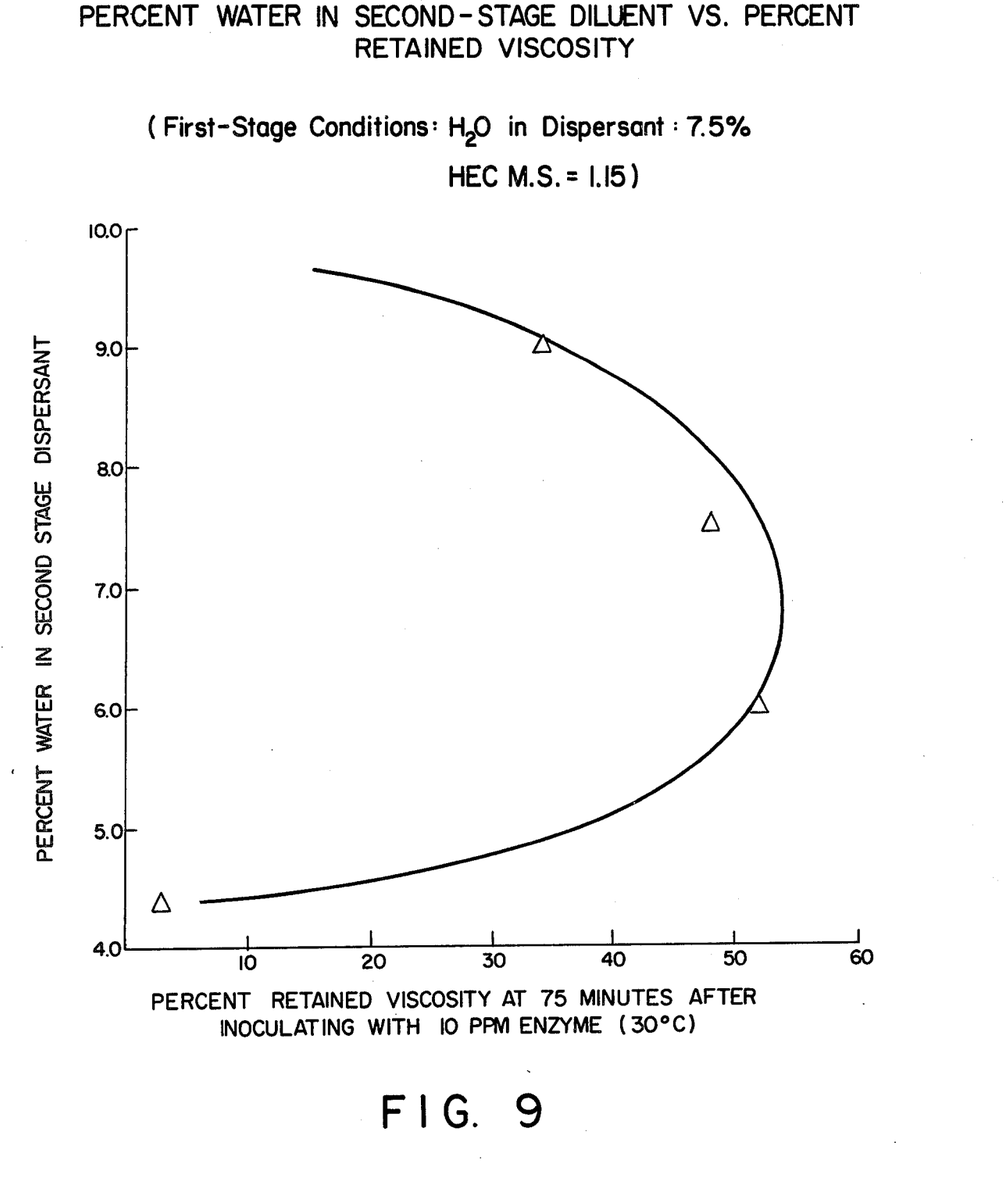
FIG. 9 is a plot of the parabolic relationship between the percent water employed in the second-stage, low caustic/cellulose catalyzed synthesis of hydroxyethyl cellulose in which 7.5 weight percent water was employed during first-stage, higher caustic/cellulose catalyzed synthesis and the process was interrupted at an intermediate M.S. of 1.15.

The preferred water immiscible dispersant employed in these studies is tertiary butanol, described in U.S. Pat. No. 2,682,535. One may also use isobutanol, n-butanol and the like or combinations of these with methylethyl ketone, acetone, isopropanol and the like. There is an optimum water distribution between the dispersant and the swollen caustic flock reaction mixture for the definition of a product with low aqueous solution insolubles and high enzymatic stability. The percent available water relationship with insolubles is illustrated for various water immiscible dispersants in FIG. 7. The percent water affects production of both the first stage M.S. product before the reaction is interrupted for a change in the caustic to cellulose ratio and the production of the higher M.S. product, under low caustic/cellulose catalyzed conditions. The importance of employing the optimum amount of water which varies with different dispersants is evident in both the partial neutralization and two-stage, extraction processes in Tables III through VIII, examples 1–47. Generally a parabolic relationship (as illustrated in FIGS. 8 and 9) exists between percent water in the dispersant phase (proportional to the available water) for each dispersant and the percent retained viscosity of the solutions inoculated with an enzyme.

Figure 7:
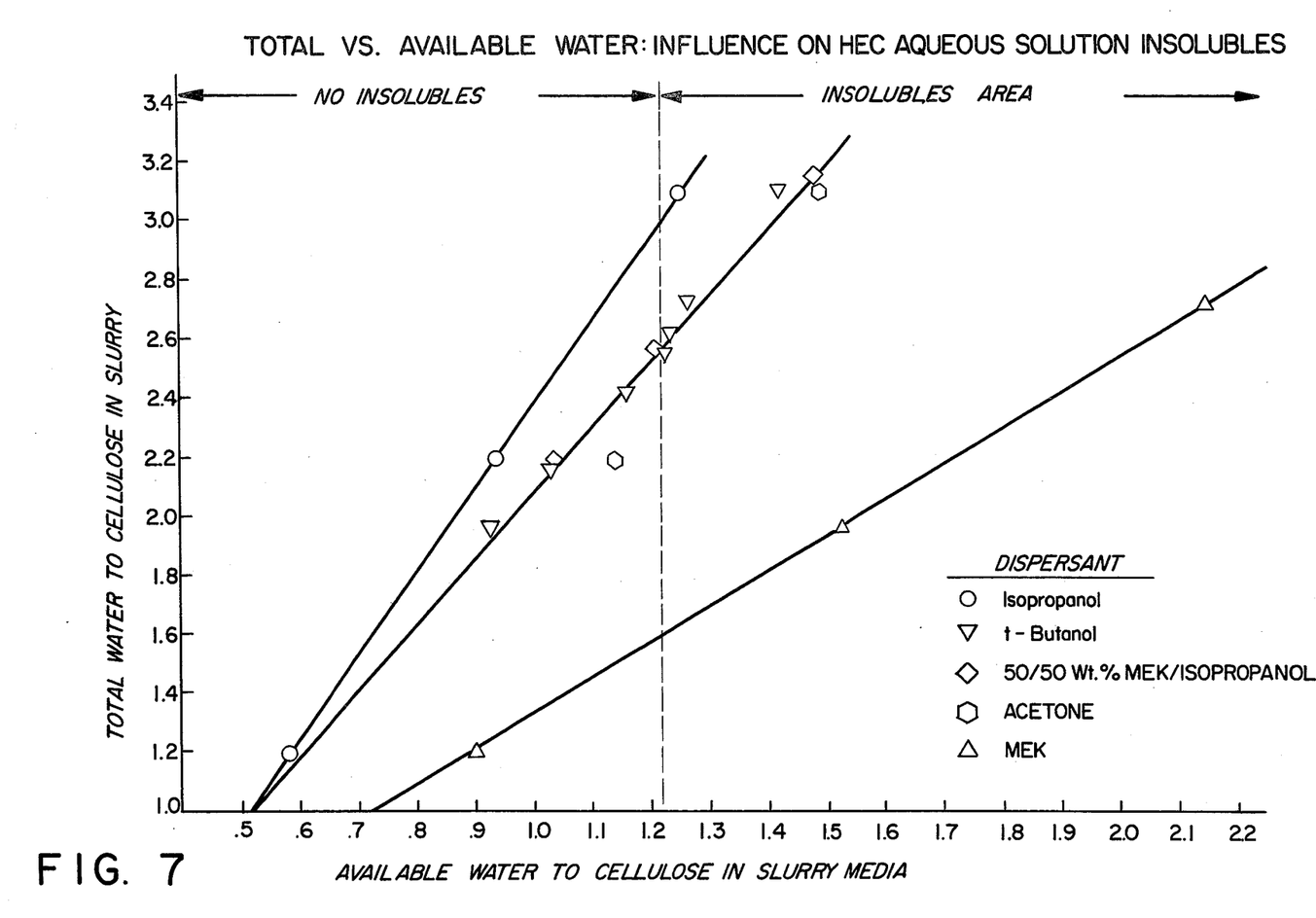
FIG. 7 is a plot of the distribution of total water in the slurry process to water available to the aqueous, caustic-swollen cellulose reaction medium, in equilibrium with different organic dispersants. Available water to cellulose values greater than 1.2 result in HEC products with high insolubles.
Figure 10:
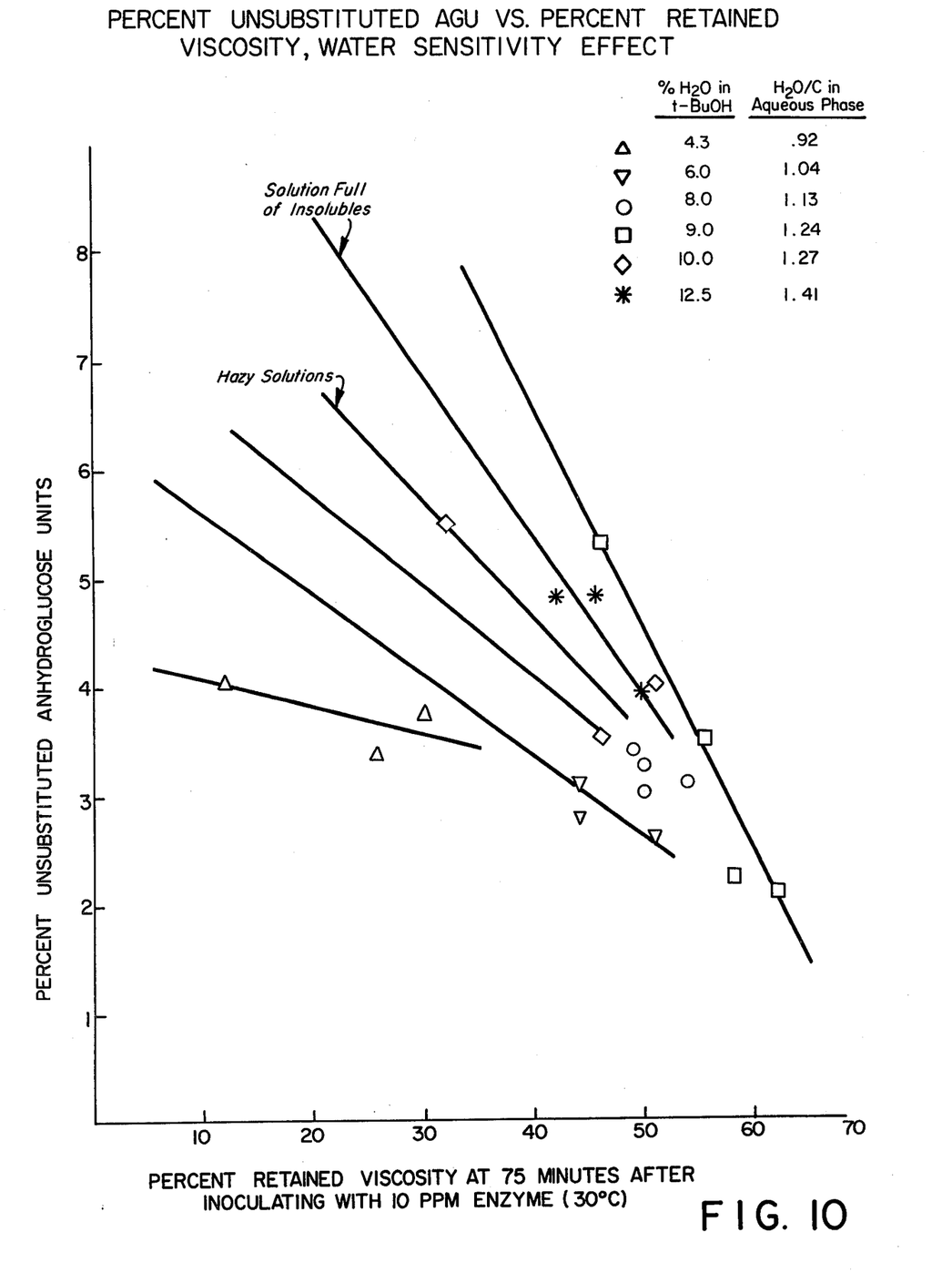
FIG. 10 is a plot of the dependence of the percent retained viscosity (% RV at 75 minutes after enzyme inoculation upon the percent unsubstituted anhydroglucose units (% u-AGU). The sensitivity of the relationship between % RV and % u-AGU is notably effected by the amount of process water employed in the synthesis of HEC.

Superimposed upon the parabolic relationship is the dependence of the final product's aqueous solution insolubles on the amount of available water, initially introduced in FIG. 7 and evident in the data contained within Tables III–VIII. Surprisingly, the amount of process water employed is observed to insensitize the percent retained viscosity as a function of the number of unsubstituted anhydrogluclose units (FIG. 10).

While not wishing to be bound by any theory or explanation, it is believed that the method of employing certain percentages of water in the slurry synthesis procedure provides a higher resistant hydroxyethyl cellulose product by not only changing the reactivity ratios but also by effecting the inherent crystallinity characteristics of cellulose (which create relatively inaccessible areas within even swollen alkali cellulose). The inacessibility of such areas during reaction results in a disproportionate concentration of unsubstituted anhydroglucose units in sequence following the reaction with ethylene oxide. For some unknown reason the combination of a multiple caustic concentration addition reaction complemented by the amount of water employed results in the production of an improved enzymatically resistance HEC. This latter result is surprising and probably results from the inaccessible crystalline areas becoming more accessible to ethylene oxide. It is believed it makes the number of unsubstituted units less relatable to enzymatic degradation by affecting the total amount of unsubstituted units available and by decreasing the diad and triad sequences of unsubstitution.

The general preparation of cellulose ethers using the etherification reagents indicated above may be found in the Encyclopedia of Polymer Science and Technology, Volume 3, pages 459–539, Interscience Publishers, NYC (1965).

The levels of hydroxyethyl substitution on the anhydroglucose units of cellulose were determined by the method outlines by P. W. Morgan, *Ind. and Eng. Chem.*, 18, 500 (1946). The salt content of the cellulose samples after treatment with the sodium hydroxide catalyst was calculated as percent $Na_2SO_4$ following pyrolysis of the sample in the presence of excess sulfuric acid. Bioresistance was measured by inoculating 1 percent by weight aqueous polymer solutions or formulation paints with 10 ppm of a cellulose enzyme derived from Aspergillus Niger, viz., Cellase 1000 Cellulase enzyme (provided by Wallerstein Company, Deerfield, Ill.). The decrease in solution viscosity of the solution at 30° C. was continuously recorded with a Brookfield Viscometer. Tests were conducted in the pH range of 5.7–7.0 either by simple adjustment (with acetic acid) or by using a potassium hydrogen phthalate-sodium hydroxide buffer solution (pH = 5.75 ± 0.05). The bioresistance of a sample is then defined as the percent of the original viscosity retained after 75 minutes.

Cotton linters were used throughout this study as the source of cellulose. The two process modifications to be discussed are:

PARTIAL NEUTRALIZATION PROCESS

The partial neutralization slurry process for the synthesis of hydroxyethyl cellulose with enhanced resistance to enzymatic hydrolysis involves charging 22±0.5 percent aqueous sodium hydroxide (at a caustic/cellulose ratio of 0.30–0.38) to an oxygen free, agitated slurry of cellulose flock in an appropriate dispersant (t-butanol, acetone, dioxane, or isopropanol/methyl ethyl ketone mixture, and the like) containing an equivalent amount of water to give 21–23 percent caustic in the aqueous phase. After about 30 minutes digestion time, enough ethylene oxide is charged to give an M.S. of 0.6–1.3. The reaction is heated to 75° C., held for 30 minutes and then cooled to about 30° C. Sufficient acid is charged to allow for a residual caustic/cellulose ratio of 0.06–0.12 (partial neutralization step). Additional ethylene oxide is then charged. The reaction slurry is slowly heated to 75° C. and held for 2.5 hours, cooled and completely neutralized. The crude product is filtered and extracted with aqueous alcohol or ketone to remove reaction by-products and neutralization salts. The molar substitution of the final hydroxyethyl cellulose is in the range of 3.6–6.0.

TWO-STAGE PROCESS

The two-stage, extraction process is identical to the partial neutralization process up to the partial neutralization step. At this point the caustic is neutralized and the 0.6–1.3 M.S. intermediate product is extracted with either an aqueous organic extractant or temporarily cross-linked with glyoxal and extracted with water. The low M.S. material is then mixed with fresh dispersant, a small amount of caustic (caustic/cellulose ratio = 0.06–0.12), and ethylene oxide. The reaction is slowly heated to 75° C., held for 2.5 hours and finally neutralized with a small amount of acid. The product can be used without additional extraction. The preferred molar substitution of the final hydroxyethyl cellulose is in the range of 3.6–6.0.

The invention is further described in the examples which follow. All parts and percentages are by weight unless otherwise specified.

EXAMPLES 1–15

PARTIAL NEUTRALIZATION SYNTHESIS OF HYDROXYETHYL CELLULOSE

The results of an investigation, covering several possible process parameters, in general, and the effect of the percentage of available water in the dispersant, slurry process, in particular, employing the partial neutralization procedure described above are presented in Table III (Examples 1–15). Considering only the influence of the available water variation on percent retained viscosity of inoculated 1% aqueous solutions, a parabolic relationship is noted.

EXAMPLES 16-47

TWO-STAGE SYNTHESIS OF HYDROXYETHYL CELLULOSE (A) EFFECT OF DRYING INTERMEDIATE M.S. PRODUCT (EXAMPLES 16-25)

The results of an initial investigation, utilizing the two-stage, extraction procedure defined above for synthesizing hydroxyethyl cellulose, are presented in Table IV (Examples 16-25). After extraction, the intermediate M.S. materials were dried, employing standard conditions of 70° C. for 16 hours. Aqueous solutions prepared with final, high M.S. HEC, synthesized by the reaction of ethylene oxide with the dried intermediates under low caustic/cellulose ratios (0.075) possessed high insoluble levels. Therefore, percent retained viscosities on inoculated solutions were not measured, since enzymes preferentially adsorb on dispersed substrates. This complication would negate any definitive interpretation of results.

(B) EFFECT OF EMPLOYING FIRST STAGE WET-CAKE INTERMEDIATE (EXAMPLES 26-30)

The results of additional studies, this time utilizing the first-stage intermediate HEC after extraction, as a wet-cake in the subsequent second-stage, low-caustic catalyzed hydoxyethylation, are presented in Table V. In these studies, as in the partial neutralization investigation (Table III), the influence of the percentage of available water employed on both solution clarity and enzymatic stability is evident. As illustrated in FIG. 8, the percent retained viscosity of inoculated solutions is parabolically related to the amount of available water employed.

(C) EFFECT OF VARYING THE PERCENT AVAILABLE WATER IN BOTH FIRST AND SECOND STAGES OF THE CATALYZED HYDROXYETHYLATION REACTION (EXAMPLES 31-38)

The results of varying the available water in both of first and second stages of the catalyzed ethylene oxide addition reactions are recorded in Table VI. Clearly the insolubles level, aqueous solution clarity and the degree of resistance to enzymatic hydrolysis are dependent upon an interrelationship between the amounts of available water in each stage. For example, a final, high M.S. HEC imparts lower aqueous solution insolubles over a broader process water variation in the second-stage if the first-stage intermediate is synthesized with 7.5 wt. % process water rather than with 9.0 wt. % process water. The percent retained viscosity is parabolically related to the amount of water employed in all cases. This is illustrated for the 7.5 weight percent studies in FIG. 9, after normalization of the results based upon the regression relationship defined in FIG. 4, (for a higher first-stage M.S. comparison with the data illustrated in FIG. 8). Water levels greater than 9.0 and less than 6.5 weight percents in the first-stage catalyzed ethoxylation result in excessive insolubles negating meaningful definitive enzyme stability testing.

(D) EFFECT OF GLYOXAL TREATMENT FOR THE DIRECT WATER-WASHING OF FIRST-STAGE, INTERMEDIATE M.S. HYDROXYETHYL CELLULOSE (EXAMPLES 39-42)

A unique feature of a multiple caustic concentration synthesis procedure is the comparative ease of extracting salts and organic by-products, generated in the high caustic catalyzed cellulose ethoxylation, from a low molar substituted, water-swellable hydroxyethyl cellulose. Extraction of the intermediate product facilities an improvement in ethylene oxide addition efficiencies during the low caustic catalyzed second stage ethoxylation and eliminates the need to separate the high M.S. product from the small amount of residual neutralization salt associated with the final, low caustic catalyzed cellulose etherification. Intermediate M.S. (0.6 to 1.3) hydroxyethyl celluloses are water-swellable and cannot be directly water washed on a practical commercial scale. The results related to glyoxal treatment to achieve direct water washing of first-stage M.S. products are presented in Table VII (Examples 39-42). Glyoxal treatment, to achieve direct water washing does not impart the adverse insoluble effect that drying of the first-stage intermediate M.S. product produced. A less economical aqueous-organic mixture can be used to extract the intermediate M.S. hydroxyethyl cellulose without utilizing glyoxal. Extraction of the first-stage product substantially improves the addition efficiencies of ethylene oxide in the lower caustic second-stage catalyzed cellulose etherifications due to the absence of reactive first-stage glycol by-products.

(E) SLURRY STABILITY EFFECTS IN SECOND-STAGE SYNTHESIS OF THE TWO-STAGE, EXTRACTION PROCESS (EXAMPLES 43-47)

Extraction of an intermediate M.S. HEC, removes organic by-products, which improve ethylene oxide addition efficiencies in lower caustic/cellulose second-stage processes, and extracts neutralization salts. In Examples 27 and 29 (Table V) it will be noted that removal of neutralization salts produce slurry instabilities upon neutralization of final high, M.S. HEC reaction mixtures. It is possible to extract organic by-products without extracting inorganic salts if certain neutralization acids are employed. For examples, employment of phosphoric acid as a neutralizing agent results in the presence of sodium phosphate which is not extractable with conventional organic-aqueous mixtures. It was observed that this inorganic salt, although remaining with the intermediate M.S. HEC, is not effective in stabilizing the high, M.S. HEC slurry upon neutralization of the low caustic/cellulose catalyzed reaction. In limited studies, sodium acetate was found to be the most effective salt for stabilizing the second-stage neutralized, high M.S. HEC reaction slurry.

The presence of significant amounts of inorganic salts, although favorable for maintaining process slurry stability, are unfavorable in certain application formulations. Consequently, synthesis conditions are desired wherein the intermediate produce could be extracted, thereby removing both the reactive organic by-products and the stabilizing inorganic salts, while maintaining slurry stability during the final manufacturing stages. As noted in Table VIII, partial removal of a stabilizing salt such as sodium acetate is not effective in maintaining stability (Examples 44 and 46). Likewise, the addition of a dispersant, e.g. t-butanol, which effectively lowers the water concentration to possibly improve slurry stability, is not effective (Example 47). It was observed that the addition of a more hydrophobic dispersant, i.e. a ketone such as methyl ethyl ketone, is effective in maintaining stability (Example 45).

Although the invention has been described in its preferred forms with a certain degree of particularity, it is understood that the present disclosure of the preferred forms has been made only by way of example and that numerous changes may be resorted to without departing from the spirit and scope of the invention.

TABLE III
PARTIAL NEUTRALIZATION SYNTHESIS OF HYDROXYETHYL CELLULOSE WITH PARAMETER AREA DEFINITION INCLUDING PROCESS WATER CONTENT

| | FIRST STEP | | | | SECOND STEP | | | FINAL PRODUCT ANALYSIS | | |
|---|---|---|---|---|---|---|---|---|---|---|
| Ex. No. | $H_2O\%^a$ | Caustic/ Cellulose Conc.$^c$ | Ethylene Oxide Ms | Oxide Eff. | Caustic/ Cellulose | Total Ms | Oxide Eff. 2nd Step | Total | Viscosity % At 30° C. | Solution Appearance | Retained Viscosity,% |
| 1 | 4.3 | .35 21.1 | 1.00 | 69.0 | 0.07 | 3.91 | 63.1 | 64.4 | 845 | clear-non-grainy | 30.0 |
| 2 | 6.0 | .35 21.1 | 1.03 | 70.7 | 0.07 | 3.77 | 59.3 | 62.0 | 1528 | " | 44.3 |
| 3 | 8.0 | .35 21.1 | 0.99 | 67.7 | 0.07 | 3.90 | 63.1 | 64.1 | 1720 | " | 50.1 |
| 4 | 8.5 | .35 22.3 | 1.13 | 77.5 | 0.07 | 3.86 | 59.1 | 63.5 | 1670 | " | 57.3 |
| 5 | 9.0 | .35 22.3 | 0.88 | 73.8 | 0.07 | 3.60 | 55.9 | 59.5 | 1670 | nearly clear-non-grainy | 53.9 |
| 6 | 10.0 | .35 22.3 | 0.83 | 64.0 | 0.07 | 3.59 | 57.8 | 59.1 | 1710 | slightly cloudy-non-grainy | 46.0 |
| 7 | 12.5 | .35 22.3 | 0.89 | 68.6 | 0.07 | 3.89 | 62.6 | 64.0 | 815 | cloudy-slightly grainy | 50.3 |
| 8 | 9.0 | .35 22.3 | 0.78 | 53.5 | 0.05 | 3.12 | 50.7 | 51.3 | 3525 | nearly clear-slightly grainy | 55.0 |
| 9 | 9.0 | .35 22.3 | 1.01 | 69.3 | 0.05 | 2.84 | 46.9 | 46.8 | 3790 | " | 46.5 |
| 10 | 9.0 | .35 22.3 | 1.23 | 66.0 | 0.07 | 3.57 | 55.6 | 58.8 | 1257 | nearly clear-non-grainy | 50.1 |
| 11 | 9.0 | .35 22.3 | 1.18 | 63.3 | 0.07 | 3.60 | 57.5 | 59.3 | 1450 | " | 52.5 |
| 12 | 9.0 | .35 22.3 | 1.18 | 63.3 | 0.07 | 3.67 | 59.1 | 60.4 | 1525 | " | 52.8 |
| 13 | 9.0 | .35 22.3 | 1.20 | 64.4 | 0.07 | 3.62 | 57.5 | 59.5 | 1812 | " | 50.1 |
| 14 | 9.0 | .35 22.3 | 1.10 | 61.6 | 0.07 | 3.87 | 65.7 | 63.7 | 1755 | " | 58.3 |
| 15 | 9.0 | .35 22.3 | 1.17 | 65.5 | 0.07 | 3.62 | 57.1 | 59.5 | 1530 | " | 55.5 |

$^a$Percent water in t-butanol dispersant.
$^b$Completely neutralized after first step. Charged additional caustic for second step.
$^c$Weight percent concentration in water.

TABLE IV
THE EFFECT OF DRYING OF THE FIRST STAGE INTERMEDIATE ON THE SOLUBILITY CHARACTERISTICS OF THE FINAL PRODUCT

| First Stage Reaction | | | | | | | | | | |
|---|---|---|---|---|---|---|---|---|---|---|
| Example No. | 16–20 | | | | | 21–25 | | | | |
| % Water | 9.0 | | | | | 9.0 | | | | |
| Dispersant/Cellulose | 15 | | | | | 15 | | | | |
| A/C | .35 | | | | | .35 | | | | |
| NaOH Conc. | 23 | → | → | → | → | 23 | → | → | → | → |
| Total Water/Cellulose | 2.58 | | | | | 2.58 | | | | |
| M.S. (I) | .64 | | | | | 1.15 | | | | |
| Oxide Efficiency | 56.1 | | | | | 60.6 | | | | |

| Second Stage Reaction | | | | | | | | | | |
|---|---|---|---|---|---|---|---|---|---|---|
| Example No. | 16 | 17 | 18 | 19 | 20 | 21 | 22 | 23 | 24 | 25 |
| % Water | 4.4 | 5.9 | 7.5 | 9.0 | 10.5 | 4.4 | 5.9 | 7.5 | 9.0 | 10.5 |
| Dispersant/Cellulose | 17.6 | → | → | → | → | 19.7 | → | → | → | → |
| A/C | .088 | → | → | → | → | .098 | → | → | → | → |
| Total Water/Cellulose | 1.07 | 1.34 | 1.61 | 1.80 | 2.15 | 1.20 | 1.50 | 1.80 | 2.10 | 2.40 |
| Reaction Time, Hrs. | 3 | → | → | → | 4 | 4 | → | → | → | → |
| Slurry Stability | Good | → | → | → | Poor | Poor | → | → | → | → |
| M.S. (II) | 2.02 (a) | 2.59 (a) | 3.20 | 3.34 | 3.96 | 4.00 | 4.19 | 3.87 | 4.05 | 3.95 |
| Oxide Efficiency (b) | 22.4 (a) | 38.7 (a) | 50.8 | 53.5 | 65.8 | 59.5 | 63.5 | 56.8 | 60.6 | 58.5 |
| Solution Appearance | Cloudy | → | → | → | | Cloudy | → | → | → | → |
| % Insolubles | (c) | (c) | 16.3 | 11.8 | 11.0 | 9.7 | 6.5 | 4.7 | 15.4 | 3.7 |

(a) Low values due to leakage in equipment
(b) Reaction time too short at low caustic/cellulose to completely react all oxide; efficiencies based on M.S. values.
(c) Insolubles excessive.

TABLE V
TWO STAGE EXTRACTION PROCESS: FIRST STAGE (M.S. = 0.86) PRODUCT WET CAKE STUDY

| First Stage Reaction | | | | | |
|---|---|---|---|---|---|
| Example No. | 26–30 | | | | |
| % Water | 9.0 | | | | |
| Dispersant Cellulose | 15 | | | | |
| Caustic/Cellulose | .35 | | | | |
| NaOH Conc. | 23 | | | | |
| Total Water Cellulose | 2.58 | | | | |
| M. S. (I) | .86 | | | | |
| Oxide Efficiency | 55.3 | | | | |

| Second Stage Reaction | | | | | |
|---|---|---|---|---|---|
| Example No. | 26 | 27 | 28 | 29 | 30 |
| % Water | 4.4 | 6.0 | 7.5 | 9.0 | 10.5 |
| Dispersant/Cellulose$^a$ | 18.7 | 18.5 | → | → | 18.6 |
| Caustic/Cellulose | .092 | → | → | → | → |
| Total Water Cellulose | 1.15 | 1.44 | 1.71 | 2.00 | 2.29 |
| Reaction Time, Hrs. | 3.5 | → | → | → | → |
| Slurry Stability | Good$^b$ | Poor | Good$^b$ | Poor | Good$^b$ |
| M. S. (II) | 5.0 | 4.4 | 4.6 | 5.2 | 4.5 |
| Oxide Efficiency | 85.2 | 72.8 | 76.9 | 88.6 | 74.3 |
| Solution Appearance | | → | Clear | → | Near Clear |
| % Insolubles | =2 | =2.5 | =1 | =1 | =1.5 |
| 1% Sol'n Visc. at 30° C (cps) | 890 | 810 | 800 | 750 | 840 |
| Bioresistance, % | | | | | |
| Retained Visc. at 75 Min. | 29 | 41 | 44 | 71 | 23 |

$^a$Charges based on HEC and not contained cellulose.
$^b$Sodium acetate added (to ca. 30 wt.% salt level) to extracted wet cake to obtain slurry stability.

TABLE VI
TWO STAGE EXTRACTION PROCESS: INTERDEPENDENCE OF THE AVAILABLE WATER IN BOTH FIRST AND SECOND STAGE PROCESSES

First Stage Reaction

| Example No. | 31–33 | | | 34–38 | | | | |
|---|---|---|---|---|---|---|---|---|
| % Water | 7.5 | | | 9.0 | | | | |
| Dispersant/Cellulose | 15 | | | 15 | | | | |
| Caustic/Cellulose | .35 | | | .35 | | | | |
| NaOH Conc. | 23 | →  | →  | 23 | →  | →  | →  | →  |
| Total Water/Cellulose | 2.36 | | | 2.58 | | | | |
| M.S. (I) | 1.15 | | | 1.15 | | | | |
| Oxide Efficiency | 65.7 | | | 60.6 | | | | |

Second Stage Reaction

| Example No. | 31 | 32 | 33 | 34 | 35 | 36 | 37 | 38 |
|---|---|---|---|---|---|---|---|---|
| % Water | 4.4 | 6.0 | 9.0 | 0 | 2.0 | 6.0 | 7.5 | 9.0 |
| Dispersant/Cellulose (c) | 19.7 | →  | →  | →  | →  | 19.9 | →  | →  |
| Caustic/Cellulose | .098 | →  | →  | →  | →  | →  | →  | →  |
| Total Water/Cellulose | 1.28 | 1.60 | 2.18 | 0.10 | 0.70 | 1.54 | 1.94 | 2.22 |
| Reaction Time, Hrs. | 4 | →  | →  | →  | →  | →  | →  | →  |
| Slurry Stability | Good | →  | →  | →  | →  | →  | →  | →  |
| M.S. (II) | 4.3 | 4.2 | 4.8 (a) | 4.2 | 3.5 | 4.3 | 5.0 (a) | 5.3 (a) |
| Oxide Efficiency | 85.5 | 82.8 | 86.0 | 62.3 | 65.8 | 65.8 | 80.4 | 88.0 |
| Solution Appearance | Clear | →  | →  | Cloudy (b) | →  | Near Clear | Clear | →  |
| % Insolubles | .5 | .5 | 1 | 6.8 | 8.8 | 1.5 | .01 | .01 |
| 1% Sol'n Visc. at 30° C (cps) | 740 | 500 | 745 | 780 | 610> | 185 (b) | 780 | 710 |
| Bioresistance % | | | | | | | | |
| Retained Visc. at 75 min. | 3 | 52 | 50 | 21 | 2 | 62 (a) | 51 (a) | 56 (a) |

(a) M.S. value outside linear regression relationship, normalized percent retained viscosity for plotting.
(b) Viscosity below critical range for comparative BR purposes.
(c) Low value due to leakage in equipment.
(d) Based upon other observations, these data have to be questioned; in all probability, stability was marginal and not recorded.

TABLE VII
TWO-STAGE, EXTRACTION PROCESS: WET-CAKE, GLYOXAL TREATED AND WATER EXTRACTION STUDIES

First Stage Reaction

| Example No. | 39–42 |
|---|---|
| % Water | 7.5 |
| Dispersant/Cellulose | 15 |
| Caustic/Cellulose | .35 |
| NaOH Conc. | 23 |
| Total Water/Cellulose | 2.36 |
| M.S. (I) | 1.15 |
| Oxide Efficiency | 65.7 |
| Grams Glyoxal Gram HEC | 0.024 |

Second Stage Reaction

| Example No. | 39 | 40 | 41 | 42 |
|---|---|---|---|---|
| No. Water Washes | 0 | 1 | 2 | 3 |
| % Salt (as Sodium Acetate) | 30.0 | 1.52 | 0.91 | 0.19 |
| Caustic/Cellulose | .131 | .107 | .100 | .098 |
| Total Water Cellulose[a] | 2.65 | 2.00 | 1.85 | 1.83 |
| Reaction Time, hrs | 3 | | | |
| M.S. (II) | 4.5 | 3.8 | 3.7 | 3.8 |
| Oxide Efficiency[c] | 69.4 | 66.0 | 70.3 | 73.2 |
| % Insolubles | ≈.5 | ≈2.0 | ≈1.5 | ≈2.5 |
| 1% Sol'n Visc. 30° C. (cps) | 690 | 920 | 910 | 860 |
| Bioresistance, % | | | | |
| Retained Visc. 75 min. | 9 | 18 | 40 | 52 |

[a] Varied because contained salt (not determined until after second stage was run) varied. This variable, of course, has a direct influence on Bioresistant Resistance
[b] Note variation in [a].
[c] Based on M.S., 3 hour reaction time is a little short for consumption of all oxide in low caustic runs.

TABLE VIII
SECOND STAGE HIGH MS HEC REACTION SLURRY STABILITY STUDIES

FIRST STAGE REACTION

| Example No. | 43–47 | | | | |
|---|---|---|---|---|---|
| Water, % | 9.0 | | | | |
| Dispersant/Cellulose | 15/1 | | | | |
| Caustic/Cellulose | .35 | →  | →  | →  | →  |
| NaOH Conc. | 22.4 | | | | |
| Total H₂O/Cellulose | 2.65/1 | | | | |
| MS | 0.95 | | | | |

Intermediate Work-Up:
Filtered Extracted
Conditions for 2nd Stage:

| Total Solids | 30.2 | 35.1 | | | |
|---|---|---|---|---|---|
| Water, % | 22.0 | 17.4 | →  | →  | →  |
| Ash, % on Resin | 34.8 | 7.2 | | | |

SECOND STAGE REACTION

| | 43 | 44 | 45 | 46 | 47 |
|---|---|---|---|---|---|
| Dispersant/Cellulose | 15/1 | 15/1 | 15/1 | 12.5/1 | 15/1 |
| Water, % in Make-up TBA | 9.0 | 9.0 | 9.0 | 9.4 | 9.0 |
| Caustic/Cellulose | .075 | 0.12 | 0.12 | .075 | .075 |
| NaOH Conc. | 22.4 | 22.4 | 22.4 | 22.4 | 22.4 |
| Total H₂O/Cellulose | 2.61 | 2.24 | 2.24 | 1.69 | 2.30 |
| Preacid Addition, Part/Part Cellulose | None | None | 4/1 MEK[b] | None | 4/1 TBA[a] |
| MS | 3.6 | 4.0 | 4.1 | 4.2 | 4.0 |
| Slurry Stability | Good | Poor | Good | Very Poor | Poor |
| % Water in Diluent | 7.5 | | | | |
| Dispersant/Cellulose[b] | 28.6 | 21.6 | 19.9 | 19.7 | |

[a] t-Butanol
[b] Methyl ethyl ketone

What is claimed is:

1. In the method of preparing hydroxyethyl cellulose by hydroxyethylating the unsubstituted anhydroglucose units of cellulose with ethylene oxide in an aqueous slurry containing at least one organic dispersant and alkali metal hydroxide catalyst, the improvement which comprises using about 6.5 to about 10.5 weight % of process water based on the total charge weight at a caustic/cellulose ratio of about 0.30 to about 0.38, interrupting the cellulose hydroxyethylation at an intermediate stage of molar substitution in the range of about 0.6 to about 1.3, adjusting the caustic/cellulose ratio at this point to about 0.06 to about 0.12 and then continuing the cellulose hydroxyethylation until a molar substitution of about 3.6 to about 6.0 is reached.

2. Method claimed in claim 1 wherein the alkali metal hydroxide catalyst is sodium hydroxide.

3. Method claimed in claim 1 wherein the alkali metal hydroxide catalyst is a mixture of sodium hydroxide and potassium hydroxide.

4. Method claimed in claim 1 wherein the hydroxyethylation of cellulose is carried out in an aqueous slurry diluted with an organic diluent.

5. Method claimed in claim 4 wherein the organic diluent is t-butanol.

6. Method claimed in claim 1 wherein the weight % of process water used is about 7.5 to about 8.0.

7. Method claimed in claim 1 wherein the catalyst/cellulose ratio is adjusted by a partial neutralization of the slurry.

8. Method claimed in claim 1 wherein the caustic/cellulose ratio is adjusted by fully neutralizing the slurry, extracting by-products from said slurry and adding sufficient alkali metal hydroxide to said slurry to afford a catalyst ratio of about 0.06 to about 0.12.

9. Method claimed in claim 8 wherein the by-products are extracted from the slurry with an aqueous organic extractant.

10. Method claimed in claim 8 wherein the by-products are extracted from the slurry by reversibly crosslinking hydroxyethyl cellulose therein and then extracting the slurry with water.

11. Method claimed in claim 10 wherein the hydroxyethylated cellulose is reversibly crosslinked with glyoxal.

* * * * *